A. HATCH.
Machines for Sawing Staves.
No. 149,119. Patented March 31, 1874.
2 Sheets--Sheet 1.
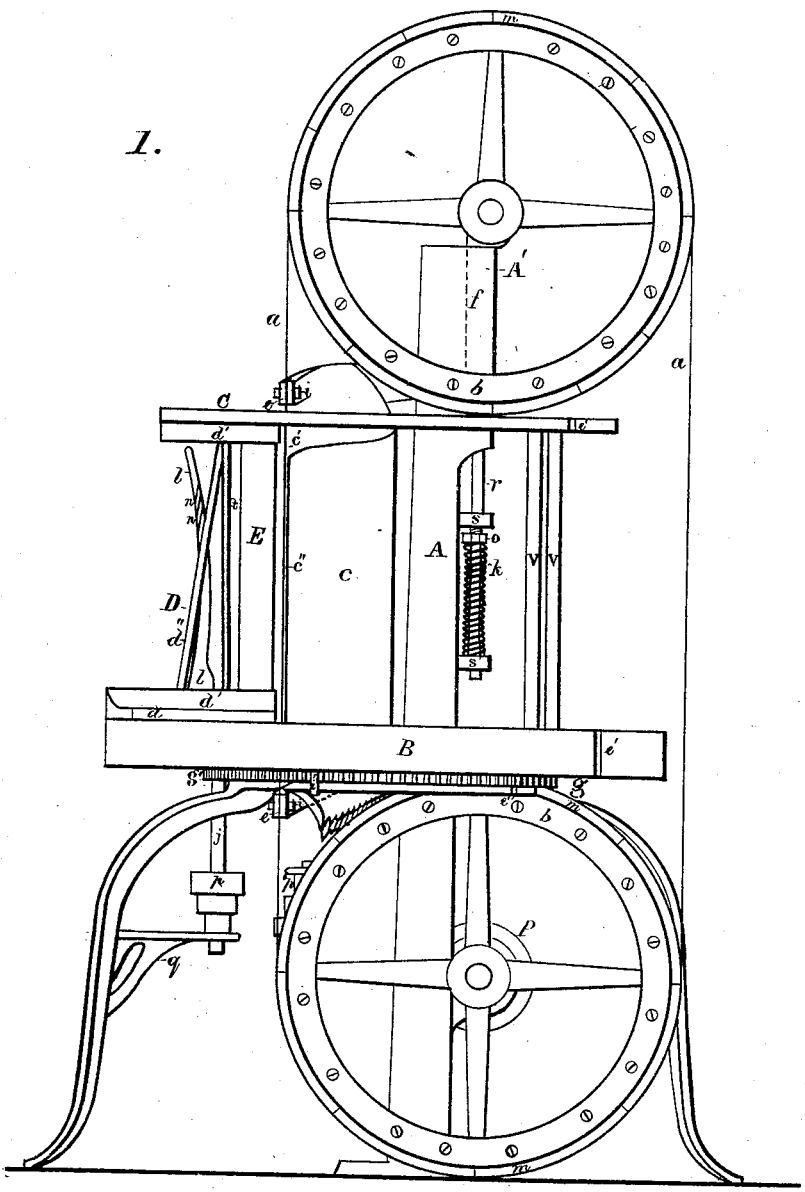

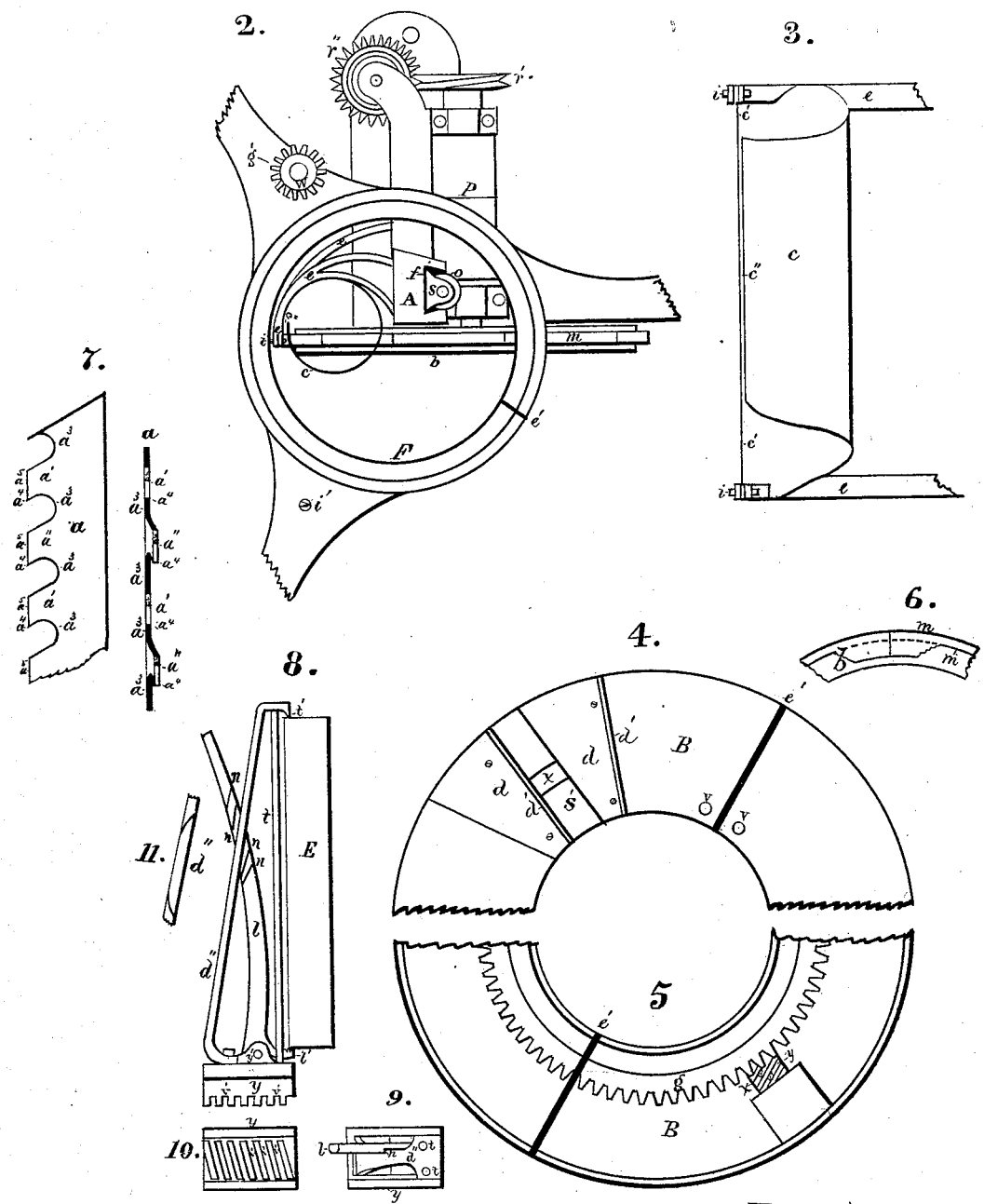

UNITED STATES PATENT OFFICE.

ASA HATCH, OF NEWCASTLE, INDIANA.

IMPROVEMENT IN MACHINES FOR SAWING STAVES.

Specification forming part of Letters Patent No. 149,119, dated March 31, 1874; application filed December 19, 1873.

*To all whom it may concern:*

Be it known that I, ASA HATCH, of the town of Newcastle, in the county of Henry and State of Indiana, have invented a Stave-Machine, of which the following is a specification:

My invention relates to improvements in machines for sawing staves for barrels, its object being to divide the staves from the bolt in such manner as to give them an even thickness throughout, with a smooth finished surface, and curved to fit the circle of the barrel; also, to lessen the waste of timber in their manufacture. Its essential feature is a band-saw, of peculiar and novel construction, for dividing the stave from the bolt or block lengthwise of the grain, the teeth being constructed somewhat like the bit of a "plow-plane," grooving their way through the wood in a similar manner. The construction of the saw-teeth by which this is accomplished will be hereinafter more fully explained, but will form the subject of a distinct application. To cut the necessary curve of the stave, every alternate tooth of the saw is set inward toward the center of the curve about the thickness of itself, so that it cuts the groove clean, leaving no surplus wood between the teeth. A line describing the curve of the stave (inside the saw) will touch the inside point of the set tooth and the middle of the saw-blade. The saw is hung upon pulleys placed at the top and lower part of a post, which stands within the circle of a revolving table. This latter is formed of an upper and lower disk, framed together by rods or pillars, and each provided with a number of converging guideways for clamping-dogs, which hold the bolts of wood perpendicularly as they are each consecutively presented to the saw during the operation of the machine. The number of these dogs and their corresponding guideways may be varied according to the size and capacity of the machine. In a machine capable of cutting seven thousand to eight thousand staves per day, having a five-and-a-half-foot table, about twelve of these dogs are used. The table and its accessories are mounted upon a circular traverse supported by legs. It is revolved by a main gear-ring bolted to its under side. Power is transmitted, through a pinion, pulleys, and shafting, from the main driving-shaft of the saw. A long scroll-spring, of brass or other metal, (which, in a full-sized machine, is about twelve inches in diameter,) stands within the circular space of the table, extending above the upper and below the lower disk of the same. It is fastened by semicircular brackets (attached to its top and bottom ends) to the post on which the band-saw is hung, its outer edge being in line with, and forming a bearing for, the back edge of the saw. This scroll is left open enough between the lapping portion and the outer edge to allow a stave as it is cut to pass in tightly, the spring of the scroll holding it till the next in turn pushes it through into the inside, when it drops into a chute beyond the lower band-saw wheel, out of the way of the next cut. The brackets which support the scroll extend forward of its outer edge, and are slotted for the reception of the saw. Wooden set-screws are inserted in them on each side of the saw, which act as guides to the same. Tension is given to the saw by means of a spiral spring on one side of the main post, through which passes a rod, the upper end of the latter bearing against the lower end of a sliding block, which supports the upper band-saw pulley, its shaft and boxes. The top of the main post is grooved downward for the purpose of receiving the sliding block. The pulleys of the band-saw are of improved construction, they being faced with segments of soft wood endwise of the grain. A groove is turned in the iron pulley-face, and the segments of wood are set in and fastened by screws or bolts.

Figure 1 is a side elevation of my stave-machine. Fig. 2, Sheet 2, is a plan view of the same, with the upper saw-pulley, its sliding block, and the table removed. Fig. 3, Sheet 2, is an elevation of the scroll-spring and its attaching-brackets. Fig. 4, Sheet 2, is a plan view of the upper surface of the saw-table, (lower disk.) Fig. 5, Sheet 2, is a plan view of the under side of the same. Fig. 6, Sheet 2, shows a section of one of the saw-pulleys. Fig. 7, Sheet 2, represents two views (side and face edge) of sections of the band-saw. Fig. 8, Sheet 2, is a side elevation of one of the clamping-dogs, with a bolt or block of stave-timber clamped in position for cutting. Fig.

9, Sheet 2, is a plan view of the dog. Fig. 10, Sheet 2, is a view of the under side of the base-block which supports the dog. Fig. 11, Sheet 2, is a sectional view of that portion of bar $d''$ which locks into notches in lever $l$.

A is the upright or main post, which supports the pulleys $b\ b$, saw $a$, and their driving mechanism. It is constructed of iron, and is set upon a base of the same. On one side is a connecting-support, on which the driving-shaft is hung. $A'$ is the sliding block, on which the upper saw-pulley is hung. Only a small portion of this block, Fig. 1, can be seen. It however fits into the dovetailed groove $f$, Fig. 2, cut for its reception in the top of post A, its lower end bearing on rod $r$ of spiral spring $k$. This rod passes through lugs $s\ s$ on right of post, and has a thread and jam-nut, $o$, for adjusting its bearing to give the required tension to the saw. B is the lower disk of revolving table, Figs. 1, 4, and 5; C, the upper disk of same, Fig. 1. V V are rods or posts which connect them. The upper disk C is smaller than the table B. These disks are about three feet apart in a full-sized machine, giving room for the upright bolts E and clamping-dogs D between them, the bolts being thirty to thirty-three inches in length. The construction of the band-saw $a$ is shown in sectional views, Fig. 7, $a'$ being the teeth (not set) in line with the body of the blade, the alternate teeth $a''$ being set inwardly a distance about equal to their thickness, so as to cause the saw to describe a curve in cutting through the bolt E. The slot which gives form to the teeth is cut in the blade at an angle of about thirty degrees, the bottom or throat $a^3$ being circular to give room for the shavings which are cut from the block. This form of band-saw does not make dust in cutting through the bolt, but shavings like those made by a carpenter's plow-plane. The points $a^4$ of all the teeth are raised about the two-hundredth part of an inch (or in proportion to the thickness of shaving required) above the face $a^5$ of the teeth, which is parallel with the back of the saw. This gives the tooth a shaving cut, the flat surface $a^5$ of the face of the tooth preventing the saw from "feeding in" farther than the depth of the raised edge.

The operation of the saw upon the wood is precisely similar to that of a carpenter's plane, as before mentioned, the wooden face of the plane being represented by the face $a^5$ of tooth $a'$ and $a''$ in saw $a$, the projection of the bit below the face of the plane being represented by the raised edge $a^4$ of the point of the tooth above its face. This band-saw does not require a steel pulley or other bearing device at the back edge to force it into the wood, and to keep it from running off the pulley. The traverse-ring F, Fig. 2, and the upper and lower disks of table, have slots $e'$ cut through them for the purpose of passing saw $a$ within the table. The upper surface of table B has angle-plates $d$ screwed to it on each side of the gains $S'$, forming part of the guideway for the reception of the dog D. Flanges $d'$ on both upper and lower disk project far enough to receive the bolt E when inserted, acting as guides to facilitate securing it in the dog, and as supports to keep it firmly in place when being cut by the saw. On the lower disk, flange $d'$ is formed on the left edge of the angle-plate $d$. The edges of $d$ are beveled or cut under to receive the foot of the dog D, which is of dovetailed form. When the angle-plates $d$ are removed, the dog can be raised out of the gain $S'$, its sides being parallel. Dog D, Figs. 1 and 8, is constructed with a bent bar, $d''$, set at an angle to the bolt E, so as to form a brace, its top end $t'$, bent down at right angles and toothed, forming the upper jaw of the dog. Its lower end is also bent at an angle, and bolted to the top of base-block Y. Lever $l$, which stands on the left of brace $d''$, has an angular bend at its foot, which extends under bolt E. It is pivoted at the angle or heel in box $Y'$ on the top of base-block Y. The foot of $l$ is serrated, and forms the lower jaw $l'$ of the dog, which is operated by throwing the top of lever outward, when the bolt is forced upward by jaw $l'$ against the fixed jaw $t'$ at the top, holding it firmly in place. It is provided with notches $n\ n$ on the side, which catch over the sharp corner formed on edge of bar $d''$, Figs. 8 and 11, locking it when drawn back. The parallel rods $t$ connect the top of bar $d''$ (or jaw) with the base-block Y. Block Y is made with parallel sides to fit gain $S'$. Its under side is provided with grooves $V'\ V'$, Figs. 8 and 10, which are cut diagonally across it. When dog D is inserted in its place in the guideway $S'$ of table B the grooved part of base-block Y extends through slot $x$ below the table. As the table revolves, pin $i'$ (seen at front of machine below B, Fig. 1, and in Fig. 2 projecting upward from one of the legs of the traverse-stand) enters in one of the grooves $V'$, and the dog D and its bolt E are carried forward the width of a groove and land (which is equal to the thickness of a stave and the saw-cut) at each revolution during the operation of the machine. A sectional view of band-saw pulley $b$ is shown in Fig. 6, $m$ being the wood segments; $m'$, the metal part of the pulley, which has a section broken out to show the depth to which the wood is let into the groove in its face. Pine or other soft wood is preferable for this purpose; as it is inserted endwise of the grain, the segments are necessarily short, but are well secured by screws or bolts. The scroll-spring $c$ is attached by brackets $e\ e$, Figs. 1, 2, and 3, to the main post A, its outer edge $c'$ being in exact line with the saw $a$, which is hung with its cutting-edge in front in Fig. 1, saw-pulleys $b$ and $b$ running to the left when machine is in motion. Revolving table B turns also the left. But one dog, D, and bolt, E, are shown in the elevation, Fig. 1, the other eleven being removed to give a clear view of other parts of the machine. By reference to this figure it will be seen that bolt E is inserted from the left of the dog, so as to set its right edge against the abutting flanges $d'$ at its upper and lower ends.

In preparing the machine for operation, bolts E are inserted in all of the dogs D, power being transmitted, through pulley P of the driving-shaft, through intermediate screw-wheel $r'$, spur-wheel $r''$, pulleys and belt $p$, and pinion $g'$, to the main gear-ring $g$, which sets the table B in motion. As it revolves the bolts E are each presented to the saw $a$, and a cut or stave taken off their inner side, and as each dog passes over pin $i'$ in the next revolution, it is moved forward the thickness of the next stave to be cut, and so on until the whole of the bolts are cut into staves. Bolts are of unequal size, making four to eight staves. As soon as the last stave is cut from a bolt, the dog is drawn back, the waste piece left in the clamping-jaws removed, and another bolt inserted in its place without stopping the machine.

I claim—

1. In combination with the revolving table carrying the stave-bolts, the saw $a$, constructed and arranged, with relation to the table, substantially as and for the purpose specified.

2. The scroll-spring $c$, with its openings $c''$ and brackets $e$, as and for the purpose specified.

3. The dog D, with its base $d''$, jaw $t'$, lever $l$, jaw $l'$, rods $t$, box $Y'$, and base-block Y, as shown and described, and for the purpose specified.

4. The combination, with a revolving table, B C, of a band-saw machine, provided with converging guideways $S'$ and slot $x$, dog D, base-block Y, grooves V V, and pin $i'$, as shown and described.

5. The combination of traverse-ring and stand F, the revolving table B C, pin $i'$, dog D, bolt E, band-saw $a$, pulleys $b$ $b$, sliding block $A'$, moving in groove $f$, and post A, as and for the purpose specified.

6. The traverse-ring F, provided with slot $e'$, gear-ring $g$, and disks B and C, as and for the purpose hereinbefore set forth.

ASA HATCH.

Attest:
 B. C. CONVERSE,
 QUINCY A. PETTS.